US008706982B2

(12) United States Patent
Saha et al.

(10) Patent No.: US 8,706,982 B2
(45) Date of Patent: Apr. 22, 2014

(54) MECHANISMS FOR STRONG ATOMICITY IN A TRANSACTIONAL MEMORY SYSTEM

(75) Inventors: Bratin Saha, Santa Clara, CA (US); Ali-Reza Adl-Tabatabai, Santa Clara, CA (US); Cheng Wang, Santa Clara, CA (US); Tatiana Shpeisman, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 11/967,231

(22) Filed: Dec. 30, 2007

(65) Prior Publication Data

US 2009/0172317 A1   Jul. 2, 2009

(51) Int. Cl.
*G06F 12/12* (2006.01)

(52) U.S. Cl.
USPC .................................. 711/159; 711/E12.069

(58) Field of Classification Search
None
See application file for complete search history.

(56) References Cited

U.S. PATENT DOCUMENTS

| 2007/0198519 A1* | 8/2007 | Dice et al. .......................... 707/8 |
| 2007/0198792 A1* | 8/2007 | Dice et al. ..................... 711/163 |
| 2008/0163220 A1* | 7/2008 | Wang et al. .................... 718/101 |

FOREIGN PATENT DOCUMENTS

WO   0075778 A1   12/2000

OTHER PUBLICATIONS

"Enforcing Isolation and Ordering in STM", Tatiana Shpeisman, Vijay Menon, Ali-Reza Adl-Tabatabai, Steven Balensiefer, Dan Grossman, Richard L Hudson, katherine F Moore, and Bratin Saha, Jun. 11-13, 2007, pp. 78-88.*
European Search Report for corresponding matter P25578EP, mailed Mar. 23, 2009.
R. Rajwar et al., "Transactional Lock-Free Execution of Lock Based Programs", Proceedings on the 10th Symposium on Acrhitectual Support for Programming Languages and Operating Systems, Oct. 2002.
R. Rajwar et al., "Virtualizing Transactional Memory", Computer Architecture, 2005, ISCA 2005, Proceedings 32nd International Symposium, Jun. 4, 2005.
M. Herlihy et al., "Transactional Memory: Architectual Support for Lock-Free Data Structures", Proceedings of the Annual International Symposium on Computer Architecture, May 16-19, 1993.
Office Action Received for European Patent Application No. 08 254 178.0 mailed on Mar. 11, 2010, 3 pages of Office Action.
Office Action Received for Chinese Patent Application No. 200810188987.9 mailed on Feb. 23, 2011, 11 pages of Office Action including 7 pages of English Translation.

(Continued)

*Primary Examiner* — Denise Tran
(74) *Attorney, Agent, or Firm* — Hanley, Flight & Zimmerman, LLC

(57) ABSTRACT

A method and apparatus for providing efficient strong atomicity is herein described. Optimized strong operations may be inserted at non-transactional read accesses to provide efficient strong atomicity. A global transaction value is copied at a beginning of a non-transactional function to a local transaction value; essentially creating a local timestamp of the global transaction value. At a non-transactional memory access within the function, a counter value or version value is compared to the LTV to see if a transaction has started updating memory locations, or specifically the memory location accessed. If memory locations have not been updated by a transaction, execution is accelerated by avoiding a full set of slowpath strong atomic operations to ensure validity of data accessed. In contrast, the slowpath operations may be executed to resolve contention between a transactional and non-transaction access contending for the same memory location.

9 Claims, 7 Drawing Sheets

(56) References Cited

OTHER PUBLICATIONS

The State Intellectual Property Office of the People's Republic of China, "Third Office Action", issued in connection with Application No. 200810188987.9, Jul. 20, 2012, 19 pages.

The State Intellectual Property Office of the People's Republic of China, "Fourth Office Action", issued in connection with Application No. 200810188987.9, Feb. 20, 2013, 8 pages.

* cited by examiner

MECHANISMS FOR STRONG ATOMICITY IN A TRANSACTIONAL MEMORY SYSTEM

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be concurrently executed. However, the increase in the number of software threads that may be executed simultaneously have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. One type of transactional execution includes a Software Transactional Memory (STM), where accesses are tracked, conflict resolution, abort tasks, and other transactional tasks are performed in software.

Previously, to ensure runtime conflicts between transactional memory operations and non-transactional memory operations do not occur, compilers treat each non-transactional memory operation as a single operation transaction. In other words, transactional operations are inserted at non-transactional memory operations to ensure runtime conflicts do not occur. However, execution of extensive barriers at non-transactional memory operations potentially wastes execution cycles.

BRIEF DESCRIPTION OF THE DRAWINGS

The present invention is illustrated by way of example and not intended to be limited by the figures of the accompanying drawings.

FIG. 4b illustrates an embodiment of the flow diagram depicted in FIG. 4a.

FIG. 4c illustrates another embodiment of the flow diagram depicted in FIG. 4a.

DETAILED DESCRIPTION

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, transaction hardware, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values. In addition, the terms reset and set, in one embodiment, refer to a default and an updated value or state, respectively. For example, a default value potentially includes a high logical value, i.e. reset, while an updated value potentially includes a low logical value, i.e. set.

The method and apparatus described herein are for providing strong atomicity in a transactional memory system. Specifically, providing strong atomicity is primarily discussed in reference to an (STM) system utilizing cache line based conflict detection and timestamp based consistency. However, the methods and apparatus for providing strong atomicity are not so limited, as they may be implemented on or in association with any transactional memory system.

Figure 1:
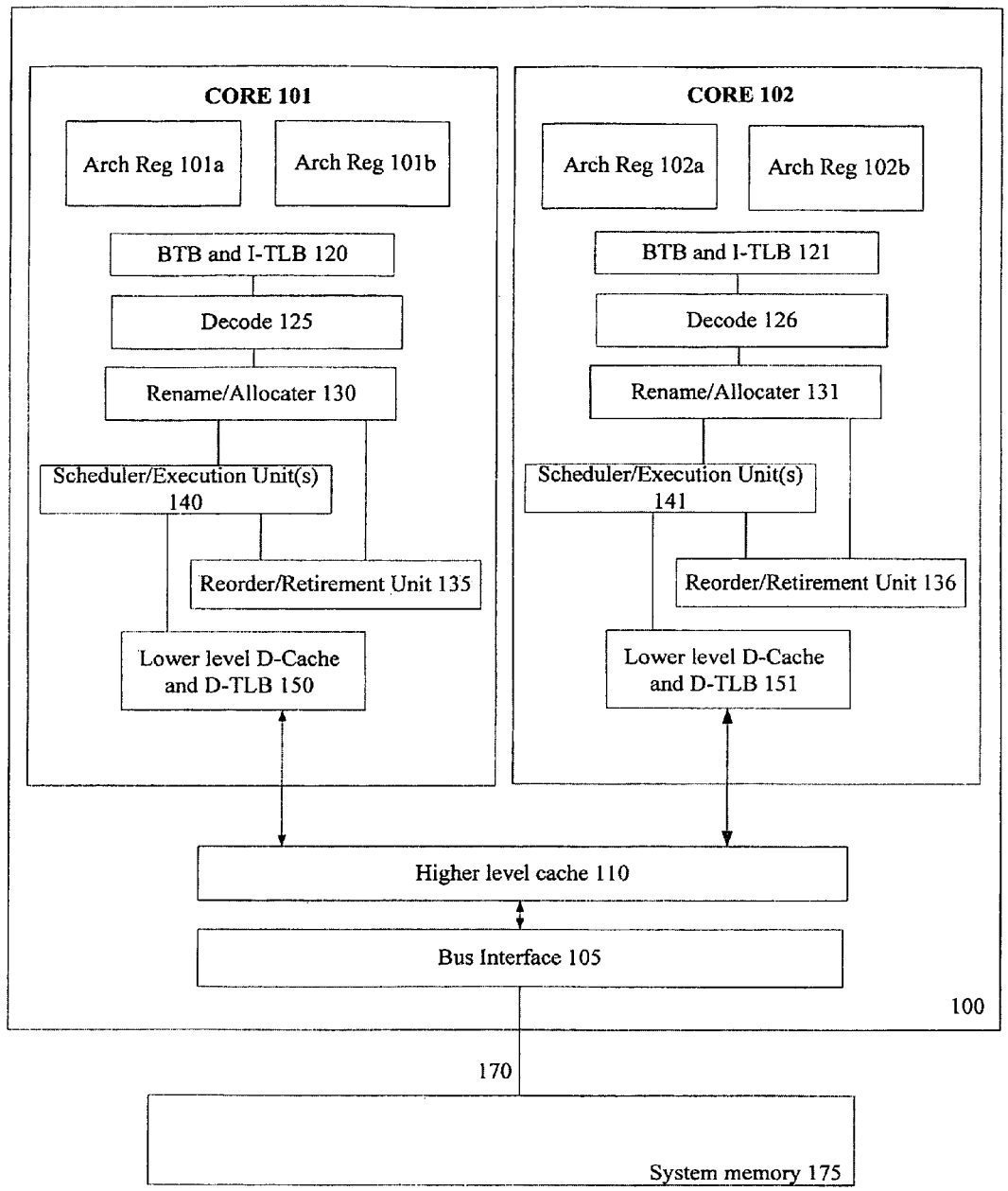
FIG. 1 illustrates an embodiment a system capable of efficient strong atomicity.

Referring to FIG. 1, an embodiment of a multi-processing element processor capable of providing optimized strong atomicity in a transactional memory system is illustrated. A processing element refers to a thread, a process, a context, a logical processor, a hardware thread, a core, and/or any processing element, which shares access to resources of the processor, such as reservation units, execution units, pipelines, and/or higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. Physical processor 100, as illustrated in FIG. 1, includes two cores, core 101 and 102, which share access to higher level cache 110. In addition, core 101 includes two hardware threads 101a and 101b, while core 102 includes two hardware threads 102a and 102b. Therefore, software entities, such as an operating system, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources.

In one embodiment, processor 100 is a multi-core processor capable of executing multiple threads in parallel. Here, a first thread is associated with architecture state registers 101a, a second thread is associated with architecture state registers 101b, a third thread is associated with architecture state registers 102a, and a fourth thread is associated with architecture state registers 102b. Reference to processing elements in processor 100, in one embodiment, includes reference to cores 101 and 102, as well as threads 101a, 101b, 102a, and 102b. In another embodiment, a processing element refers to elements at the same level in a hierarchy of processing domain. For example, core 101 and 102 are in the same domain level, and threads 101a, 101b, 102a, and 102b are in the same domain level, as they are all included within a core's domain.

Although processor 100 may include asymmetric cores, i.e. cores with different configurations, functional units, and/or logic, symmetric cores are illustrated. As a result, core 102, which is illustrated as identical to core 101, will not be discussed in detail to avoid obscuring the discussion.

As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage.

Typically bus interface unit 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol. Bus interface unit 105 as shown is also to communicate with higher level cache 110.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode traces. Module 120 also potentially includes a branch target buffer to predict branches to be executed/taken and an instruction-translation buffer (I-TLB) to store address translation entries for instructions. Here, a processor capable of speculative execution potentially prefetches and speculatively executes predicted branches.

Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. As a specific example, a processor may include a page table structure to break physical memory into a plurality of virtual pages. Data cache 150 may be utilized as a transactional memory or other memory to track tentative accesses during execution of a transaction, as discussed in more detail below. Furthermore, when tracking tentative accesses utilizing a STM system, software tables/data may be held in system memory 175 and cached in lower level cache 150.

A transaction, which may also be referred to as a critical section of code, includes a grouping of instructions, operations, or micro-operations, which may be grouped by hardware, software, firmware, or a combination thereof. For example, instructions or operations may be used to demarcate a transaction or a critical section. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible.

However, if the transaction is invalidated during its pendancy, the transaction is restarted without making the updates globally visible. As a result, pendancy of a transaction, as used herein, refers to a transaction that has begun execution and has not been committed or aborted, i.e. pending. Example implementations for transactional execution include a Hardware Transactional Memory (HTM) system, a Software Transactional Memory (STM) system, and a combination thereof.

A Hardware Transactional Memory (HTM) system often refers to tracking access during execution of a transaction with processor 100 in hardware of processor 100. For example, cache 150 is to cache a data item/object from system memory 175. During execution of a transaction, an annotation/attribute field, which is associated with the cache line in cache 150 holding the data object is utilized to track accesses to and from the cache line. In one embodiment, the annotation field includes a read storage cell and a write storage cell. Each of the storage cells is set upon the corresponding read or write to indicate if a read or write has occurred during a pendancy of a transaction.

A Software Transactional Memory (STM) system often refers to performing access tracking, conflict resolution, or other transactional memory tasks in or at least partially in software. As a general example, a compiler, when executed, compiles program code to insert read and write barriers for load and store operations, accordingly, which are part of transactions within the program code. A compiler may also insert other transaction or non-transaction related operations, such as commit operations, abort operations, bookkeeping operations, conflict detection operations, and strong atomicity operations.

As stated above, previously non-transactional memory operations are treated as single transactions in a strongly atomic system that provided isolation between transactional and non-transactional code. Usually, a compiler inserts operations at the non-transactional memory access to ensure strong atomicity, i.e. ensuring validity between transactional and non-transactional memory operations. An example of a previous operation inserted at a non-transactional memory access operation to ensure strong atomicity includes a lock operation, such as a test operation, to determine if a lock indicates a memory location is available/un-owned. However, in one embodiment, a reduced number of strong atomicity operations are inserted to ensure validity without performing some slowpath operations, such as the lock operation, to determine if a lock is available. More detail of providing efficient strong atomicity is discussed below.

Figure 2:
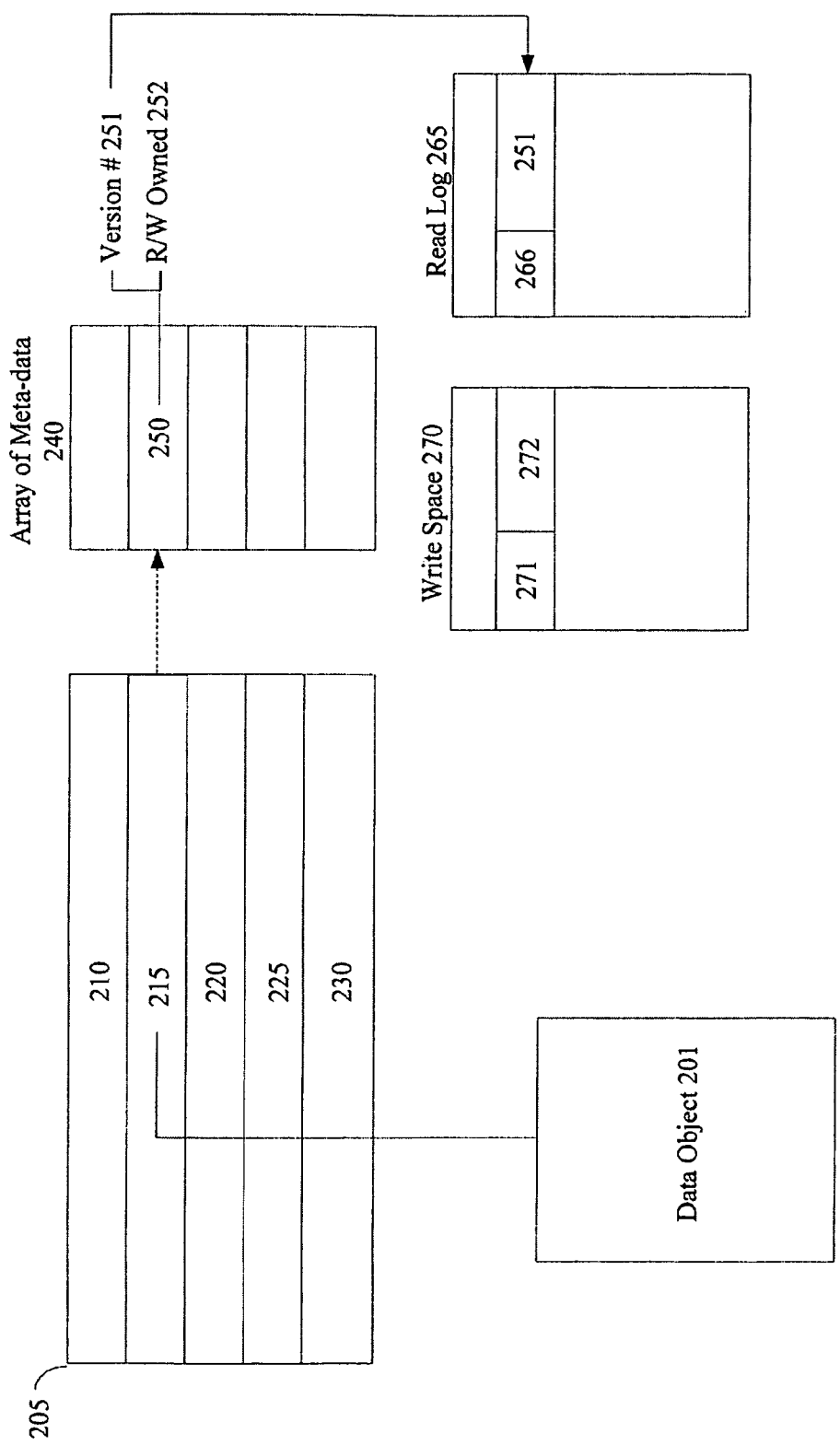
FIG. 2 illustrates an embodiment of a Software Transactional Memory (STM) system to provide efficient strong atomicity.

Referring to FIG. 2, a simplified illustrative embodiment of a STM system is depicted. Data object 201 includes any granularity of data, such as a word, a data element/operand, an instruction, a line of memory, a cache line, a programming language defined object, a field of a programming language defined object, a table, a hash table, or any other known data structure or object. In one embodiment, an address referencing or associated with data object 201, such as a physical or virtual address, is hashed to index into an array/table of lock/meta-data locations, such as array of meta-data 240. As a specific example, a number of the lower bits of an address are masked off and then hashed to index into array of locks 240. Here, data object 201 is said to be associated with cache line 215, as cache line 215 is to hold/cache data object 201. Furthermore, data object 201 is also said to be associated with meta-data location 250, as an address referencing data object 201 or location 250, is utilized to index into table 240 at location 250.

Usually, a value held in meta-data location 250 indicates whether data object 201 is locked or available. In one embodiment, when data object 201 is locked, meta-data location 250 includes a first value to represent a locked state, such as read/write owned state 252. Yet, any lock or lock state may be utilized and represented in meta-data location 250. When unlocked, or available, meta-data location 250 includes a second value to indicate an unlocked state. In one embodiment, the second value is to represent version number 251. Here, version number 251 is updated, such as incremented, upon a write to data object 201, to track a current version of data object 201.

Read/load operations are logged in read log 265 while write/store operations are buffered or logged in write space 270. This logging/buffering is often referred to as barrier operations, as they often provide obstacles to be performed for validating a transactional read or write operation. In one embodiment, logging a read includes updating or creating an entry in read log 265 with representation of an address 266 associated with version number 251. Here, read log 265 may resemble an address based lookup table with address 266, which may be a linear, virtual, physical, or other portion of an address referencing data object 201, being associated with corresponding version number 251. Note that read log 265 may be a data object, such as data object 201, which is to be held in a system memory and cached in cache 205.

In one embodiment, a write to data object 201 updates cache line 215 with a new value, and old value 272 is held in write space 270. Upon committing the transaction, the old values in write log 270 are discarded and the tentative values are made globally visible, and conversely, upon aborting the transaction, the old values are restored to the original locations overwriting the tentatively held values. Often, this type of software transactional memory (STM) system is referred to as a write log STM or an in-place update STM, as write space 270 resembles a write log to hold old values, while tentative transaction values are "updated in-place."

In another embodiment, a write to data object 201 is buffered in write space 270, which resembles a write buffer, while old values remain in their original locations. Here, write buffer 270 holds a tentative transaction value to be written to location 215. Upon aborting the transaction, the tentative values held in write buffer 270 are discarded, and conversely, upon committing the transaction, the tentative values are copied to the corresponding memory locations overwriting the old values. Often, this type of software transactional memory (STM) system is referred to as a write buffering STM, as write space 270 resembles a write buffer with tentative transaction values being buffered/held in write space 270.

Note, that write space 270 may include any storage area. In one embodiment, write space 270 is a higher level memory, such as a second level cache or system memory. In another embodiment, write space 270 may be a separate write space held in registers or other locations of memory. Write space 270 may resemble a lookup table with an address associated with a logged old value or buffered tentative value. In yet another embodiment, write space 270 may include a program stack or separate stack memory held in any of the aforementioned storage areas or a separate storage area.

However, whether write space 270 is utilized as a write-buffer to buffer tentative values or a write-log to log old values, the write, when committed, releases lock 250. In one embodiment, releasing lock 250 includes returning meta-data location 250 to a value that represents an unlocked or un-owned state. This value is obtained by incrementing a global timestamp. This timestamp counts the number of transactions that have finished executing i.e committing or aborting. This versioning allows for other transactions to validate their reads that loaded data object 201 by comparing the other transactions logged version values in their read logs to current version value 251.

The example above includes one embodiment of implementing an STM; however, any known implementation of an STM may be used. In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system. For example, HTM features, such as annotation bits, may be utilized to accelerate an STM, such as being set/reset based on accesses to the cache line, which software may interpret and utilize to accelerate transactional tracking/conflict detection on a cache line level.

As stated above, a compiler, when executed, to compile program or application code, may insert, at transactional memory accesses, transactional operations, when executed, to perform read and write barrier functions. Examples of read barrier operations include: computing an index into table of locks 240 to determine location 250, testing to see if meta-data location 250 holds an un-owned version value, and logging the version value in read log 265.

In one embodiment, efficient strong atomicity operations are inserted at non-transactional memory accesses to perform optimized read barrier functions to provide strong atomicity, i.e. ensure valid non-transactional memory accesses. As an example, the strong atomicity operations, when executed, are to determine if a memory location to be accessed by the non-transactional read access has been updated since a beginning of a function. To illustrate, a strong atomicity operation is inserted at the beginning of each function. The strong atomicity operation, when executed, is to make a local copy of Global Transaction Value (GTV).

The GTV is incremented in response to ending a transaction. In one embodiment, after the GTV is incremented, the new GTV value is used as an un-owned version value to release locks. In other words, a GTV tracks/indicates the latest or most recent transaction to abort/commit, which often results in the GTV being referred to as a Most Recent Transaction Value. As a result, a local copy of the GTV at a specific time, such as at a beginning of a function, may be referred to as a timestamp, as it provides a snapshot of the GTV at a beginning of the function. Therefore, in the embodiment discussed above, at the beginning of a function, a copy of the GTV is made. This local copy, which is referred to here as a Local Transaction Value, indicates the latest transaction to update memory locations at the time of the copy/move, i.e. the beginning of the function.

In one embodiment, a strong atomicity operation inserted at a non-transactional memory access within the function, when executed, is to compare the LTV with a version value associated with a memory location to be accessed as a result of executing the non-transactional memory read operation. Here, if the version value is greater than the LTV, then the memory location has been updated since a beginning of the function. In other words, since the time the GTV was copied as an LTV, a transaction has ended, the GTV has been incremented, and the new GTV has been written as a new version to a lock location associated with the memory location. Therefore, when the version is greater than the LTV, it is determined that at least the above update process has occurred. In contrast, if the version value is equal to or less than the LTV, then the memory location has not been updated since the beginning of the function. In one embodiment, the lock location stores a value with the highest bit set when it is locked, while all version numbers (and the value in the GTV) always have the highest bit unset. To prevent overflow of the GTV as a result of many committing transactions, a larger value, such as a 64 bit value, may be utilized.

To illustrate, assume a non-transactional memory operation in a function includes a load operation to load from cache line 215. At the beginning of the function, a GTV, which we in this example starts at a decimal value of 10, is copied as a LTV in response to executing a first strong atomicity operation. As execution continues, assume a transaction updates cache line 215 during commit, increments the GTV to a decimal value of 12, and releases lock 250 associated with line 215 utilizing the incremented GTV value of 12. When the non-transactional load is encountered a second strong atomicity operation is executed to compare the LTV with a current version held in meta-data location 250. As meta-data location 250 has been previously updated to 12 and the LTV holds a value of 10, then it is determined that line 215 has been updated since a beginning of the function. Consequently, any number of actions may be taken in response to determining a location to be accessed has been updated, such as executing slowpath, i.e. extra strong atomicity barrier, operations to ensure validity of the non-transactional load operation.

In another embodiment, the strong atomicity operation inserted at a non-transactional memory access, when executed, is to compare the LTV value to a counter value, which indicates a number of transactions that have started. In other words, here, it is not determined if the specific memory location has been updated from a beginning of a function, but rather if any transaction has started updating any memory locations from the beginning of the function. The transaction counter is incremented in response to a transaction starting and/or a transaction starting to update memory locations. For example, in a write-buffering STM, the counter is incremented when a transaction reaches a commit point and starts to update memory locations. As another example, in a write-log or in-place update STM, the counter is incremented when the transaction is started.

Utilizing the example from above, at a beginning of a function including the non-transactional load operation, a GTV of 10 is copied as an LTV, and a start transaction counter also initially holds a value of 10. Here, when another transaction begins or starts updating memory locations, depending on the implementation, a start transaction counter is incremented, i.e. from a value of 10 to 11. However, the second strong atomicity operation in this embodiment, when executed, is to compare the LTV to the start transaction counter. When the counter is the equal to or less than the LTV, then the non-transactional load is determined to be valid, i.e. a transaction has not updated memory locations since a beginning of the function.

However, as in this example, when the start transaction counter value, i.e. 11, is greater than the LTV, i.e. 10, then it is determined memory locations have been updated since the beginning of the function, i.e. a transaction has started updating memory locations since the beginning of the function. As above, any number of actions may be taken in response to determining memory locations have been updated since a beginning of the function, such as executing slowpath operations, executing a handler, and/or utilizing another method of ensuring data validity.

Figure 3A:
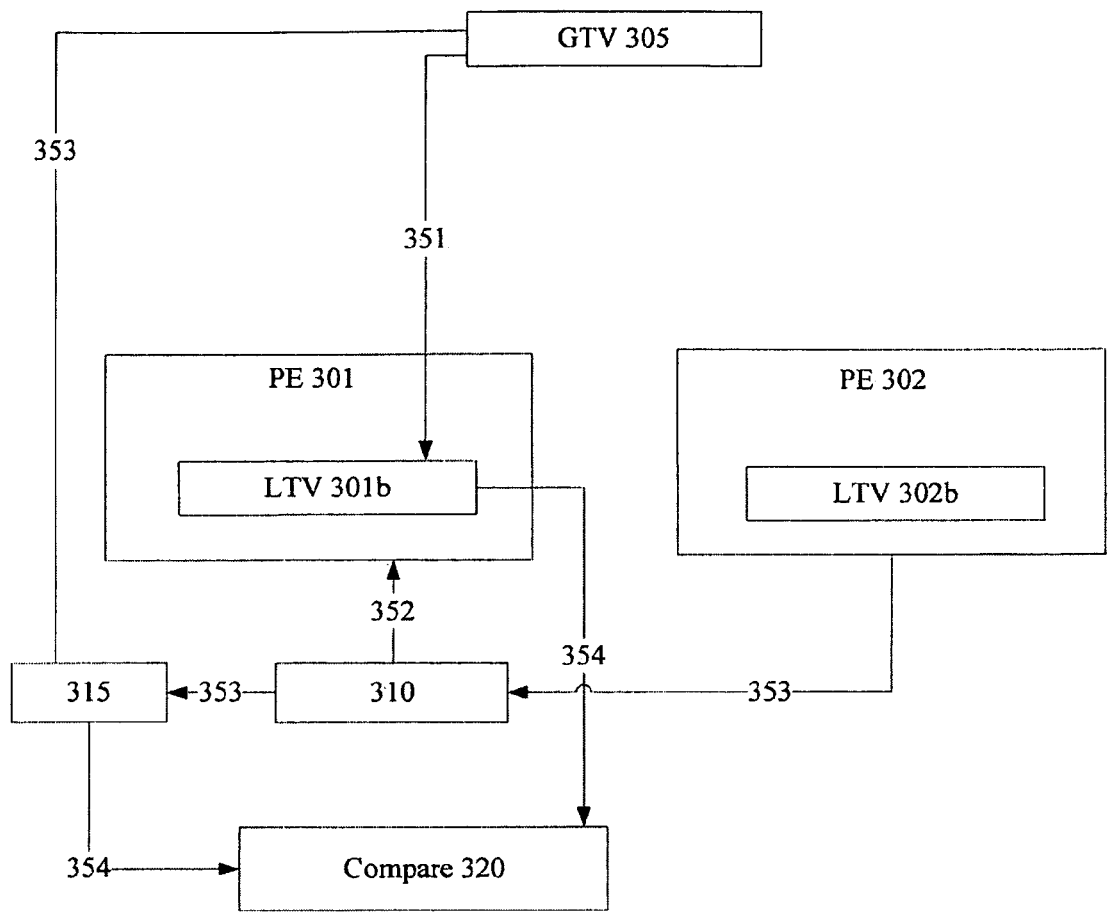
FIG. 3a illustrates an embodiment of logic to provide efficient strong atomicity.

Turning to FIG. 3a, an embodiment of logic to provide efficient strong atomicity is illustrated. In one embodiment, the logic illustrated in FIG. 3a is included in an integrated circuit, such as in a microprocessor. Processing element 301 and 302 include any processing element mentioned above, such as a hardware thread, a core, or other logical processor/processing element. Storage element 305 is to hold a global transaction value (GTV). Note, that a storage element includes any storage area to hold values, such as a register, memory location, cache location, stack location, or other storage area. For example, storage element 305 includes a register to hold a GTV. In another embodiment, a program stack location is to hold the GTV.

At a beginning of a function to be executed on PE 301, a copy of the GTV is to be held in storage element 301b as a Local Transaction Value (LTV) in response to executing operation 351. As above, storage element 301b may include any storage element/area, such as a register, memory location, cache location, stack location, or other storage area. Note that storage element 301b is illustrated within PE 301; however, storage element 301b may be associated with PE 301 in any manner. For example, storage element 301b may be a register in a group of registers associated with PE 301 or be a program stack location associated with processing element 301. Although not specifically, discussed storage element 302b operates in a similar manner as storage element 301b. As illustrated, elements 301b and 302b are separate; however, they may be physically located within the same device or storage area and associated with PEs 301 and 302, accordingly. GTV may also be referred to as a Most Recent Transaction Value, i.e. indicating the last transaction to abort/commit, or as a global timestamp, i.e. indicating a transaction or number of transactions committed/aborted at a specific point in time. As illustrated, operation 351, essentially takes a snapshot of the GTV held in storage element 305 at a beginning of execution of a function.

Operation 352 includes a non-transactional load operation, i.e. a load operation not included in a critical section of a transaction, when executed, to load from cache line 310. Processing element 302 executes transactional operation 353, such as a commit operation, an abort operation, and/or a store operation, which results in updating of cache line 310. In one embodiment, at commit or an abort of the transaction, the GTV held in storage element 305 is updated/incremented. The newly incremented GTV may be utilized as a version number to update meta-data location 315, which is associated with cache line 310.

Note from above, as an example, meta-data location 315 may be associated with cache line 310 through a hash function of at least a portion of an address associated with line 310 to index into meta-data location 315 within a table of meta-data locations. Also, in one embodiment, a version number in location 315 indicates cache line 310 is unlocked/un-owned. Alternatively, cache line 310 is locked in response to a locked/owned value being held in location 315. As an example, a locked/owned value is indicated in location by 315 through a logical one being held in the most-significant bit (MSB) position of location 315, while a version number is indicated through a logical zero being held in the MSB position of location 315.

Compare logic 320, in operation 354, compares the lock value held in meta-data location 315 with the copy of GTV 305 from the beginning of the function held in LTV storage area 310b. If the value held in location 315 is less than or equal to the LTV in 301b indicating that the version held in location 315 and by association memory location 310 has not been updated since GTV 305 was copied into LTV storage element 301b, then execution continues normally. When the access is determined to be valid, the execution flow continues without execution of additional extraneous barrier operations.

In contrast, if the value held in meta-data location 315 is greater than the LTV held in storage element 310b, then it is determined that memory location 310 has been updated since the GTV was cached in LTV storage element 301b. Note, in the embodiment where a locked value includes a logical one held in the MSB position of location 315, the locked value will be greater than any GTV utilized as a version number to update location 315, as a version number includes a zero in the MSB position. Therefore, in one embodiment, it is determined location 310 has been updated from the time location 315 holds a locked value through the time meta-data location 315 is updated to a greater version value.

In response to the lock value held in location 315 being greater than an LTV held in storage element 301b, any number of strong atomicity resolution actions may be taken. As one example, a group of slowpath operations may be executed to ensure a valid non-transactional memory access. The slowpath operations may include other more cautious operations, such as testing/checking of lock availability before performing the access. As another example, other contention resolution algorithms may be utilized, such as executing a handler or aborting a transaction that is contending for the memory location.

As an oversimplified illustrative example to demonstrate an embodiment of operation, GTV 305 initially holds a GTV of 0001 (decimal value of one) and meta-data location 315 also includes a version of 0001. At a beginning of a function, the GTV value of 0001 is copied to LTV storage element 301b. A non-transactional load from line 310 is performed. Additionally, a transaction being executed by PE 302 commits, which results in GTV 305 being incremented to 0010 (a decimal value of two). During execution of the transaction location 315 is transitioned to a lock value, such as 1000 (decimal value of eight), and line 310 is updated. Furthermore, after update, when releasing the lock, the new GTV value of 0010 is stored as a new version in meta-data location 315. When compare logic 320 compares the lock value held in meta-data location 315 to LTV 301b, the lock value is greater than LTV 301b both when the lock is held, i.e. 1000>0001, and after the version is updated, i.e. 0010>0001. As a result, strong atomicity resolution may be performed, such as executing slowpath operations.

Figure 3B:
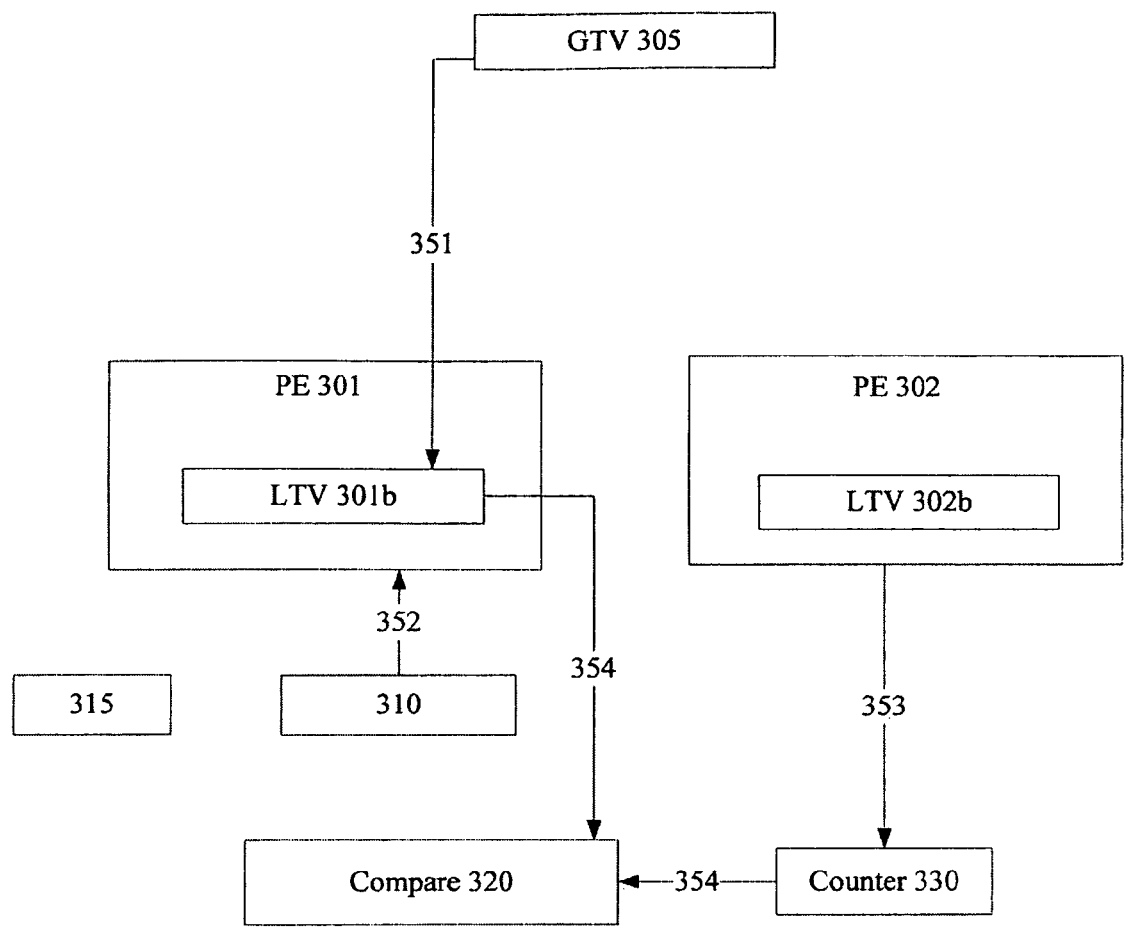
FIG. 3b illustrates another embodiment of logic to provide efficient strong atomicity.

Turning to FIG. 3b, another embodiment of a module to provide efficient strong atomicity is illustrated. Here, operations 351-353 operate in a similar manner as discussed in reference to FIG. 3a. However, in operation 354, compare logic 320 compares LTV 301b to transaction count value held in start transaction counter 330. In one embodiment, transaction counter 330 is incremented in response to starting a transaction. In another embodiment, transaction counter 330 is incremented in response to a transaction starting to update memory locations. In an update-in place STM, updates occur/begin as the transactional stores are performed. Therefore, counter 330 would be incremented at that point. However, in a write-buffering STM, counter 330 is incremented when the transaction commits, i.e. when memory updates begin.

If counter 330 is less than or equal to LTV 301b, then no transaction has started to update memory locations, and execution may continue normally. However, if counter 330 is greater than LTV 301b, then a transaction has started to update memory locations. Consequently, other slower path operations may be executed. For example, with comparing LTV and a counter value, other operations may be optimized or avoided such as computing an accessed memory location, a hash value into a meta-data location, and a version value held in the meta-data location. Therefore, if the counter value is greater than the LTV indicating memory locations have been updated, then a version may be compared to determine if the accessed memory location has been updated. Furthermore, any other slowpath instructions or operations may be executed.

As an oversimplified illustrative example to demonstrate an embodiment of operation, GTV 305 initially holds a GTV of 0001 (decimal value of one) and counter 330 includes a transaction value of 0001. At a beginning of a function, the GTV value of 0001 is copied to LTV storage element 301b. A non-transactional load from line 310 is performed. Additionally, a transaction being executed by PE 302 in a write buffering STM commits, which results in counter 330 being incremented to 0010. When comparing transaction value of 0010 and a LTV value of 0001, the transaction value is greater indicating a transaction has updated memory locations. Note, here, the transaction may not update memory location 310. Therefore, compare logic 320 may conditionally compare the version to the LTV as discussed above to determine if the transaction has updated memory location 310 specifically.

Figure 4A:
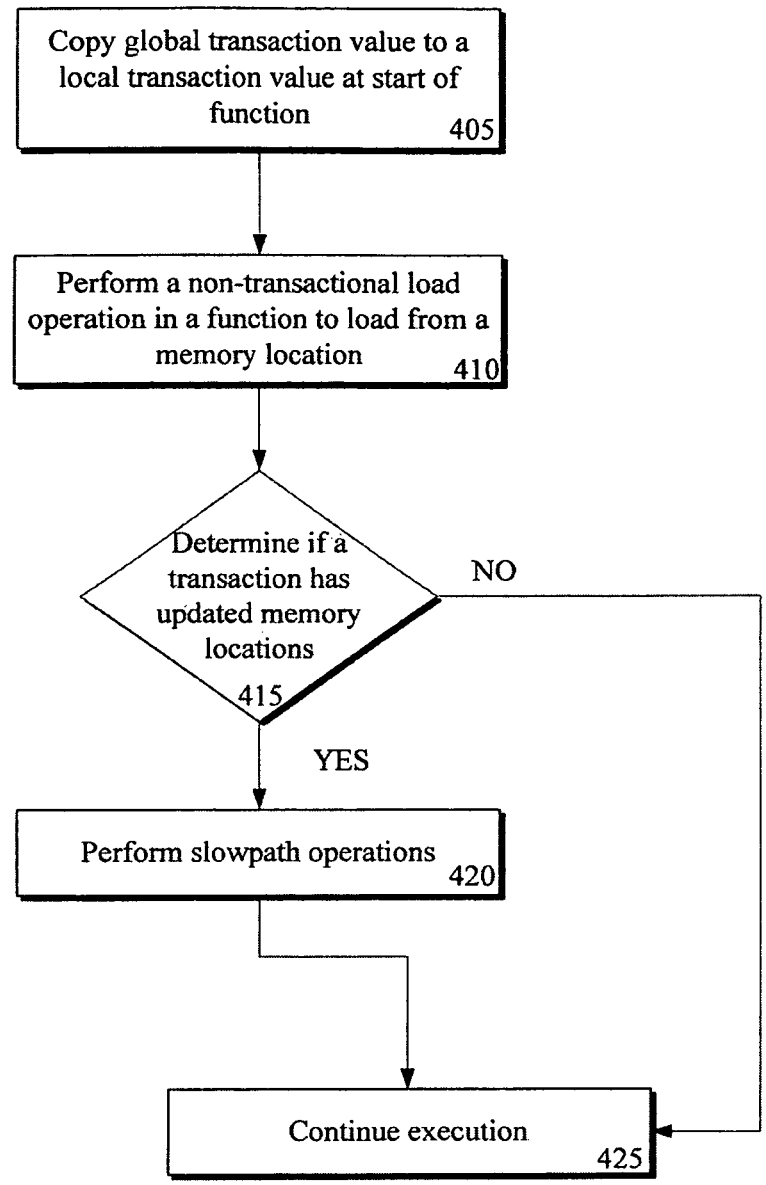
FIG. 4a illustrates an embodiment of a flow diagram for a method of providing strong atomicity.

Referring next to FIG. 4a, an embodiment of a flow diagram for a method of providing efficient strong atomicity is illustrated. Furthermore, as discussed above, a compiler, when executed, is to compile application/program code. During compilation, transactional operations, such as read barriers, write barriers, commit operations, and abort operations, may be inserted. Additionally, non-transactional strong atomicity operations may be inserted, which when executed, are to perform the operations/functions described above and/or below in reference to FIGS. 4a-4c.

In flow 405, a global transaction value (GTV) is copied to a local transaction value (LTV) at a start of a function. In one embodiment, the GTV is a global timestamp incremented/updated in response to commit and abort of a transaction. As an example, a strong atomicity operation, when executed, to perform the copy/move is inserted at the beginning of a non-transactional function.

Next, in flow 410, a non-transactional load operation, which is included within the function, is performed to load from a memory location. In flow 415, it is determined if a transaction has updated memory locations since the beginning of the function. If a transaction has not updated memory locations since a beginning of the function, then the load is determined to be valid and execution is continued normally in flow 425. In contrast, if the transaction has updated memory locations since a beginning of the function, then in flow 420 slowpath operations are performed. Note that slowpath operations may include any resolution operations to ensure validity of the non-transactional load, including checking, testing, and/or spinning/waiting on a lock, computing a version, checking a version has not changed, and/or performing the non-transactional load again.

Figure 4B:
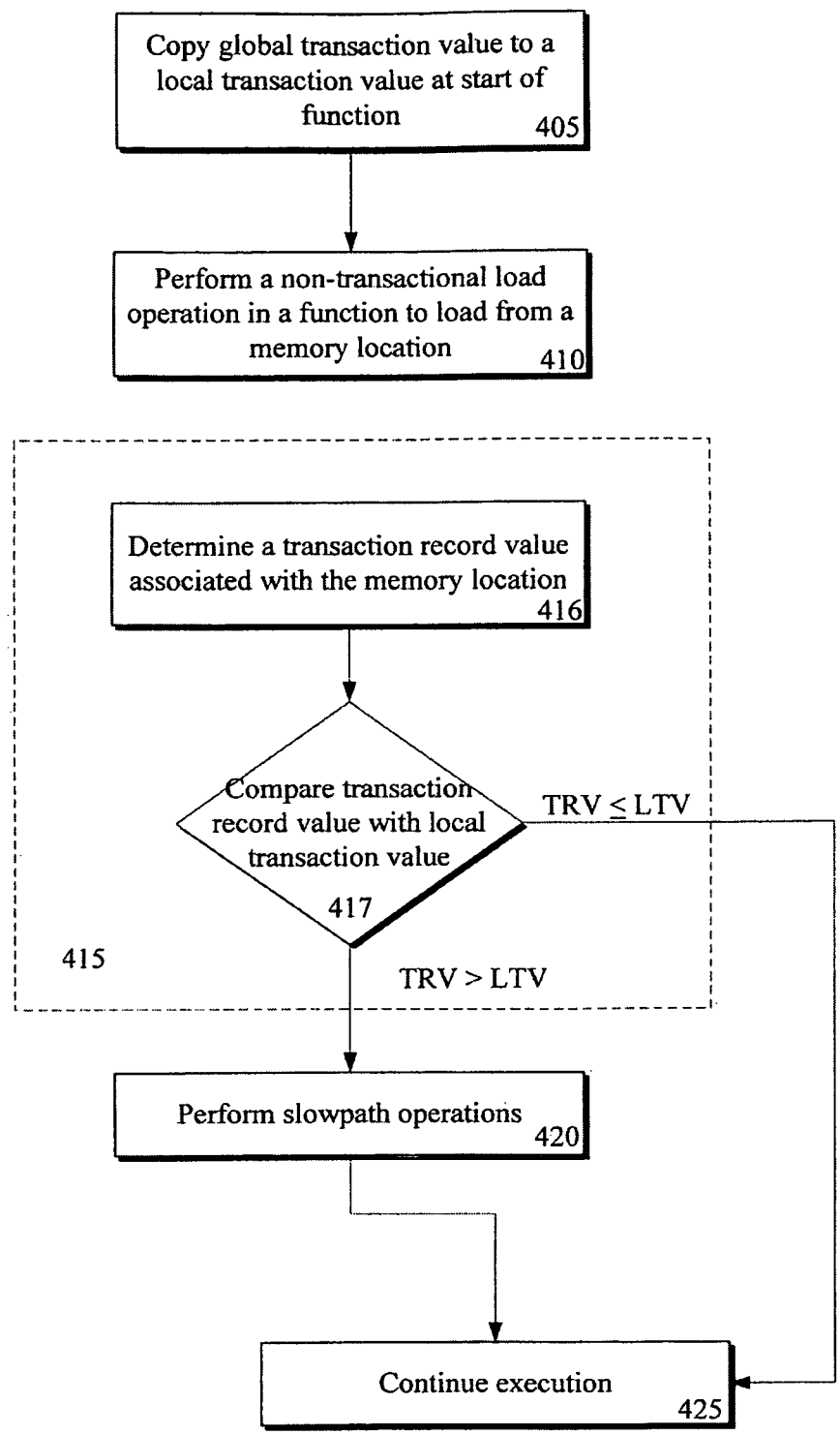

FIG. 4b illustrates an embodiment of a flow diagram for determining if a transaction has updated memory locations since a beginning of the function of FIG. 4a. Flows 405, 410, 420, and 425 are similar to the same flows in FIG. 4a. However, in flow 416, a transaction record value, which is associated with the memory location loaded from, is determined. In one embodiment, at least a portion of an address referencing the memory location is hashed into a table of transaction records. The transaction record value is determined from the transaction record associated with the memory location. In flow 417, the transaction record value is compared with the local transaction value copied from the GTV in flow 405. In one embodiment, the global transaction value (GTV) is incremented in response to a transaction being committed/aborted. Additionally, the transaction record value is updated with the newly incremented GTV to release a lock on the memory location owned by the transaction that is being committed.

Therefore, if a transaction record value is less than or equal to the LTV, then it is determined the memory location has not been updated since a beginning of the function and execution continues normally in flow 425. However, if the transaction record value is greater than the LTV, then it is determined that the memory location has been updated since the GTV was cached as the LTV, i.e. since the beginning of the function. Here, slowpath instructions/operations are executed to ensure validity of the non-transactional load, such as checking the transaction record, spinning/waiting on the transaction record to become un-locked/in-owned, acquiring ownership of the transaction record, and/or performing the non-transactional access again.

Figure 4C:
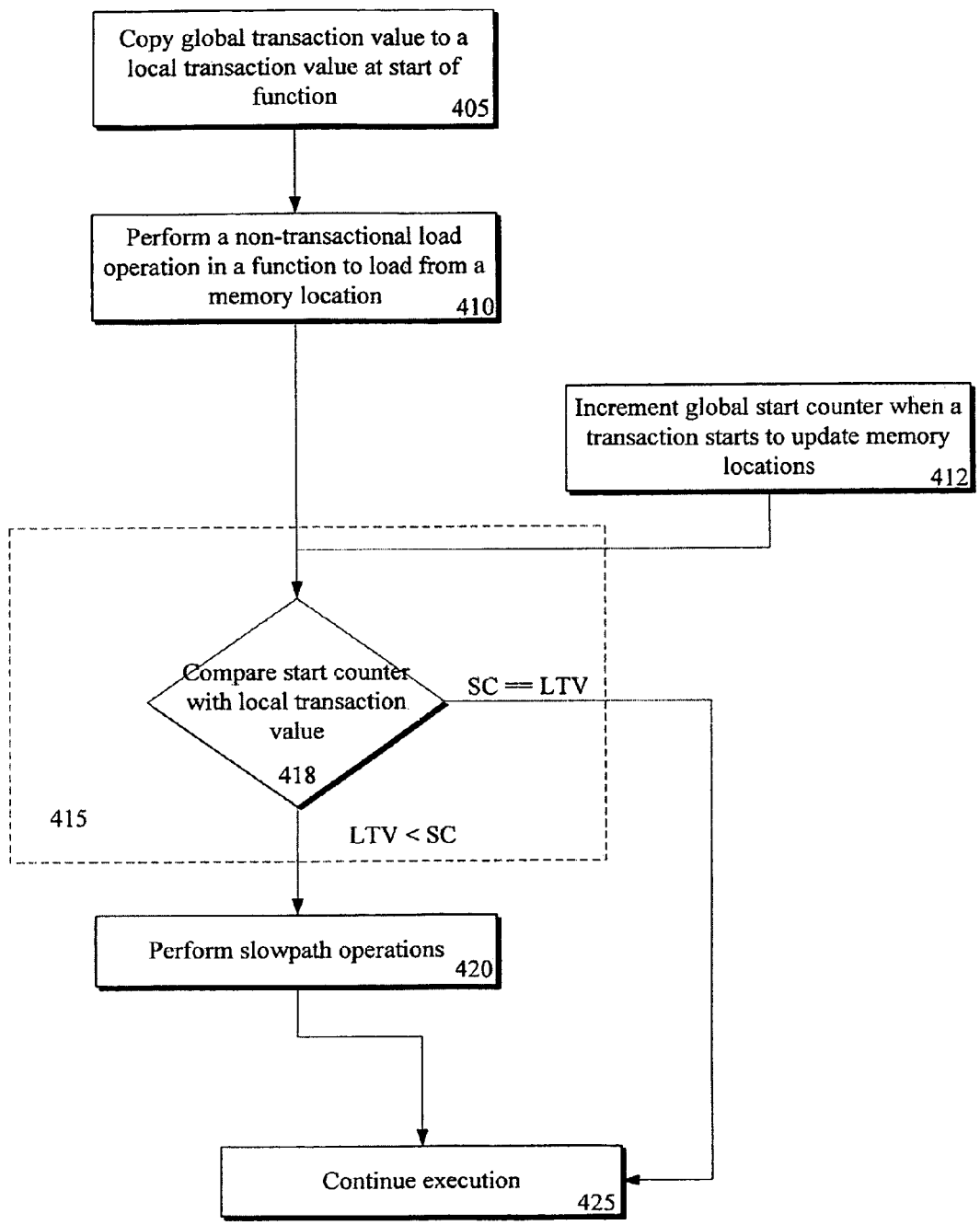

Turning to FIG. 4c, another embodiment of a flow diagram for a method of determining if memory locations have been updated since a beginning of a function is illustrated. Here, a global start counter is incremented when a transaction starts to update memory locations in flow 412. In a write-buffering STM, locations are updated at commit, so the start transaction counter would be incremented at commit of a transaction. However, in an in-place update STM, the memory locations are tentatively updated during execution of the transaction, so the counter may be incremented in response to starting the transaction or when the first transactional store is encountered. Note that the counter may be incremented by integer or multiples thereof. For example, if a version number includes even numbers and an owned value includes odd numbers, the counter may be incremented by even multiples to coincide with versions or a GTV.

In flow 418, the start counter value is compared with the local transaction value (LTV). Therefore, it is determined whether any transactions have started updating memory locations since the LTV was last updated, i.e. the beginning of the function. Note that the specific memory location accessed may have not been updated; however, a transaction has started updating memory locations. Here, in execution of slowpath operation at flow 420, a version may be compared in a similar manner to the method illustrated in FIG. 4b, to determine if the specific memory location has been updated. However, other operations to ensure validity of the non-transactional load may be alternatively or additionally executed.

As illustrated above, optimized strong atomicity operations may be inserted, when executed, to provide efficient strong atomicity for non-transactional read accesses. Extensive barrier operations for each non-transactional load may be potentially avoided to accelerate execution of non-transactional loads in a transactional memory system. Furthermore, combinations of levels of aggressive execution may be utilized. For example, non-transactional accesses may be performed with only determining if another transaction has started, without having to compute a version value. If no transaction has started updating memory locations, execution can continue without having to perform extensive bookkeeping. However, if memory locations have been updated, then a version may be computed and compared to a local timestamp to determine if a specific memory location has been updated. Consequently, execution may still be somewhat accelerated by avoiding checking/spinning on a lock. In addition, if the memory location has been updated, then previous full strong atomicity operations, i.e. a slower path of instructions, may be executed to ensure data validity between transactional and non-transactional memory accesses.

The embodiments of methods, software, firmware or code set forth above may be implemented via instructions or code stored on a machine-accessible or machine readable medium which are executable by a processing element. A machine-accessible /readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specified exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A machine readable storage device or storage disc including program code, which, when executed by a machine, causes the machine to at least:
   detect a non-transactional load operation in a function including a plurality of memory operations, the non-transactional load operation to load from a first one of a plurality of memory locations;
   insert a first atomicity operation in the function to store a copy of a global transaction value as a local transaction value (LTV);
   insert a second atomicity operation to compare the LTV to a transaction counter value to determine whether a transaction has updated any of the memory locations in the plurality of memory locations after an initiation of the function, the transaction counter to increment when any of the memory locations is updated; and
   when the comparison of the transaction counter value and the LTV indicates that the transaction has updated at least one of the memory locations after the initiation of the function, insert a third atomicity operation to analyze a version value associated with the first one of the memory locations to determine whether the first one of the memory locations was updated after the initiation of the function, wherein the first and second atomicity operations do not include a lock operation that determines if a lock associated with the first memory location is un-owned.

2. The storage device or storage disc of claim 1, wherein the program code, when executed, causes the machine to insert the lock operation to be executed in response to determining the transaction has updated at least one of the memory locations after the initiation of the function.

3. The storage device or storage disc of claim 1, wherein the first atomicity operation is to update a register to hold the LTV.

4. A machine readable storage device or storage disc including program code which, when executed by a machine, causes the machine to at least:
   detect a non-transactional load operation in a function, the non-transactional load operation to load from a first one of a plurality of memory locations; and
   in response to detecting the non-transactional load operation in the function, determine if any of the memory locations in the plurality of memory locations has been updated after an initiation of the function by:
      inserting a first atomicity operation in the function to update a register with a local transaction value (LTV) corresponding to a global transactional value;
      inserting a second atomicity operation to compare a transaction counter value associated with the plurality of memory locations to the LTV, the transaction counter value to be incremented when any of the memory locations is updated; and
      when the transaction counter value is greater than the LTV, inserting a third atomicity operation to analyze a version value associated with the first one of the memory locations to determine whether the first one of the memory locations has been updated after the initiation of the function, wherein the third atomicity operation comprises:
         a first version operation to obtain an address associated with the one of the memory locations; and
         a second version operation to compute an index into a transaction record in a table of transaction records to obtain the version value.

5. The storage device or storage disc of claim 4, wherein the transaction record is to hold a locked value to indicate the first one of the memory locations is owned and to hold the version value to indicate the first one of the memory locations is un-owned, and wherein the locked value includes a logical one in a Most-Significant-Bit (MSB) of the transaction record and the version value includes a logical zero in the MSB of the transaction record.

6. The storage device or storage disc of claim 4, wherein the second atomicity operation is to:
   determine that at least one of the memory locations has been updated after the initiation of the function if the transaction counter value is greater than the LTV; and
   determine that none of the memory locations has been updated after the initiation of the function if the transaction counter value is less than or equal to the LTV.

7. A system comprising:
   a memory to hold program code including a plurality of non-transactional operations; and
   a processing logic circuit in communication with the memory to:
      detect a non-transactional load operation in a function including a plurality of memory operations, the non-transactional load operation to load from a first one of a plurality memory locations;
      insert a first atomicity operation in the function to store a copy of a global transaction value as a local transaction value (LTV);
      insert a second atomicity operation to compare a transaction counter value to the LTV to determine whether at a transaction has updated any of the of memory locations in the plurality of memory locations after an initiation of the function, the transaction counter to increment when any of the memory locations is updated; and
      when a the comparison of the transaction counter value and the LTV indicates that the transaction has updated at least one of the memory locations after the initiation of the function, insert a third atomicity operation to analyze a version value associated with the first one of the memory locations to determine whether the first one of the memory locations was updated after the initiation of the function, wherein the first and second atomicity operations do not include a lock operation that determines if a lock associated with the first memory location is un-owned.

8. The system of claim 7, wherein the program code further includes a plurality of slowpath operations associated with the plurality of non-transactional operations, and wherein the processing logic circuit is to execute the plurality of slowpath operations if the transaction counter value is greater than the LTV and to not execute the plurality of slowpath operations if the transaction counter value is less than or equal to the LTV.

9. A method, comprising:
   detecting a non-transactional load operation in a function, the non-transactional load operation to load from a first one of a plurality of memory locations; and
   in response to detecting the non-transactional load operation in the function, determining if any of the memory locations in the plurality of memory locations has been updated after an initiation of the function by:
      inserting a first atomicity operation in the function to update a register with a local transaction value (LTV) corresponding to a global transactional value;
      inserting a second atomicity operation to compare a transaction counter value associated with the plurality of memory locations to the LTV, the transaction counter value to be incremented when any of the memory locations is updated; and
      when the transaction counter value is greater than the LTV, inserting a third atomicity operation to analyze a version value associated with the first one of the memory locations to determine whether the first one of the memory locations has been updated after the initiation of the function, wherein the transaction record is to hold a locked value to indicate the first one of the memory locations is owned and to hold the version value to indicate the first one of the memory locations is un-owned, and wherein the locked value includes a logical one in a Most-Significant-Bit (MSB) of the transaction record and the version value includes a logical zero in the MSB of the transaction record.

\* \* \* \* \*